Sept. 1, 1953
F. LA GRECA
2,650,485
SERVING DISH
Filed Nov. 25, 1949
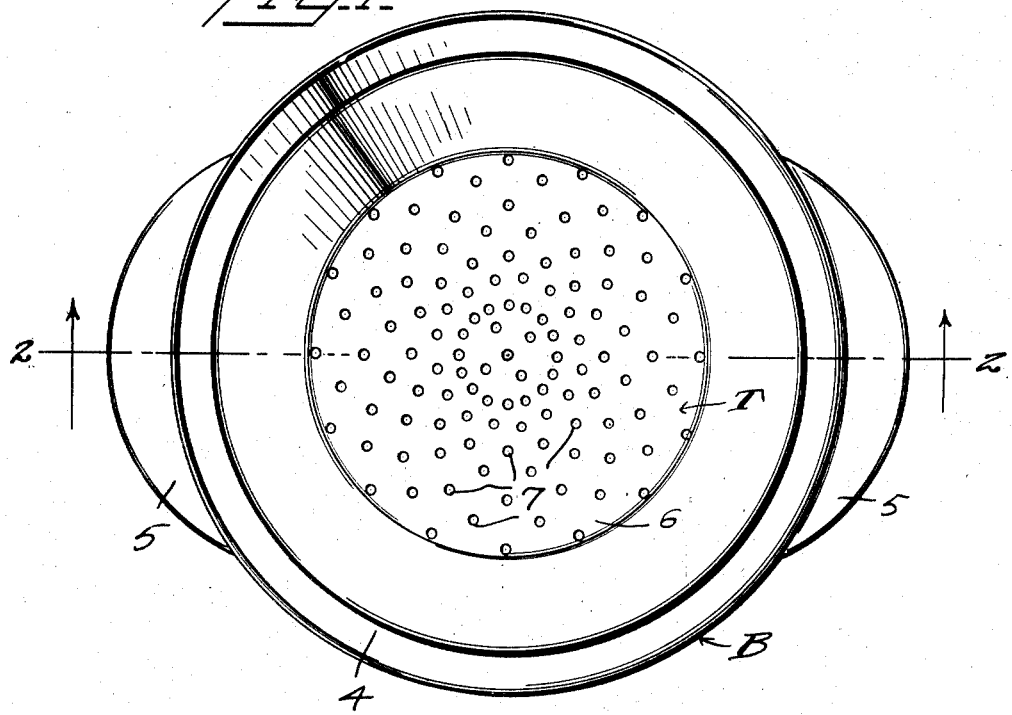
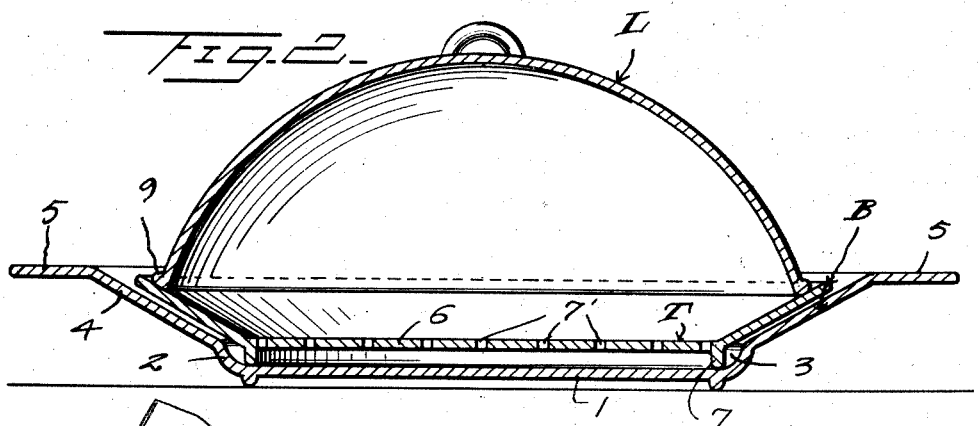
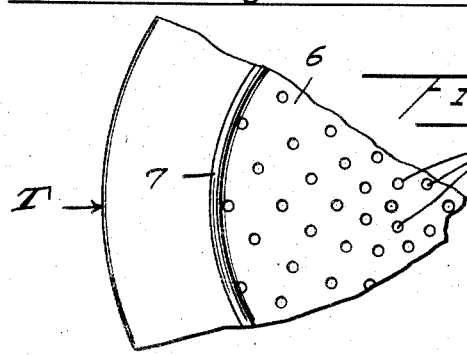
INVENTOR
*Frank LaGreca*
BY
ATTORNEY

Patented Sept. 1, 1953

2,650,485

UNITED STATES PATENT OFFICE 2,650,485

SERVING DISH

Frank La Greca, Philadelphia, Pa.

Application November 25, 1949, Serial No. 129,349

1 Claim. (Cl. 65—15)

This invention relates to a serving dish and it is primarily an object of the invention to provide a dish especially adapted for use in the serving of fried foods and the like.

It is also an object of the invention to provide a serving dish comprising an assembly whereby oil or shortening used in frying and retained by the food when placed upon the dish will be readily collected as it drips from the food.

The invention consists in the details of construction and in the combination and arrangement of the several parts of my improved serving dish whereby certain advantages are attained, as will be hereinafter more fully set forth.

In order that my invention may be better understood, I will now proceed to describe the same with reference to the accompanying drawings, wherein:

Figure 1 is a view in top plan of a serving dish embodying the invention, the cover or lid being omitted;

Fig. 2 is a sectional view taken substantially on the line 2—2 of Figure 1, the cover or lid being applied; and Figure 3 is a fragmentary view in bottom plan of the drip plate as herein comprised unapplied.

In the embodiment of the invention as illustrated in the accompanying drawings, B denotes a bottom plate of desired dimensions and which includes a bottom wall 1 defined by a relatively low upstanding wall 2 which provides a collecting well 3.

The upper margin of the wall 2 is continued by a wide surrounding rim 4 which is disposed upwardly and outwardly with respect to the wall 2 on a predetermined angle, preferably substantially thirty (30°) degrees. The outer or peripheral margin of the rim 4 at diametrically opposed points is provided with the outwardly directed flanges to provide handling elements for the plate B.

Nesting from above in the bottom plate B is a top or drip plate T which includes a bottom wall 6 of a radius slightly less than the radius of the bottom wall 1 of the plate B. The marginal portion of the wall 6 is provided with a continuous depending flange 7 which provides a support for the plate T when positioned on the plate B with the bottom wall 6 of the plate T spaced from the wall 1 of the plate B.

The wall 6 of the top plate T is provided over its area with drain openings 7 so that drippings from the foodstuff placed upon the plate T will pass through the openings 7 and be collected within the well 3 of the plate B.

The margin of the wall 6 of the plate T is also continued by a wide surrounding rim 8 disposed upwardly and outwardly with respect to wall 6 on a predetermined angle and preferably of approximately thirty (30°) degrees.

A dome-like lid or cover L is adapted to be rested upon the rim 8 of the plate T, the open face of the lid or cover L preferably being of a diameter to have the free edge 9 of the lid or cover L engage the outer or high marginal portion of the rim 8 of the plate T.

The dish as herein comprised is especially designed and adapted for use in the serving of fried foods such as peppers and eggs, omelet and the like. Before serving the food to the person it is preferred to permit the food to set a while on the plate T so that the oil or shortening on the food may drip thereof and pass through the openings 7 into the collecting well 3 of the bottom plate B.

The dish is particularly intended for table service and may be finished in any manner preferred to increase its attractiveness.

The lid or cover L is used to keep warm the foodstuff on the plate and of course to protect such foodstuff against dust and other foreign matter.

From the foregoing description it is thought to be obvious that a serving dish constructed in accordance with my invention is particularly well adapted for use by reason of the convenience and facility with which it may be assembled and used.

I claim:

A serving dish comprising a lower plate and a top plate fitting therein, said lower plate comprising a flat circular bottom, a low outwardly and upwardly curving wall surrounding and forming a continuation of said bottom and an upwardly and outwardly sloping outer wall extending from the top edge of said curving wall, said top plate comprising a flat circular perforated bottom of the same diameter as the first bottom, a depending flange upon the underside of the perforated bottom at the periphery thereof and resting upon the first bottom at the joining line between the latter and said curving wall to support the perforated bottom above the first bottom, and an upwardly and outwardly inclined wall surrounding and extending from the periphery of the perforated bottom in slightly spaced relation with respect to a major portion of said sloping outer wall, said upwardly and outwardly inclined wall being of less height than said upwardly and outwardly sloping wall, said curving wall forming with said flange an annular channel for the collection in the same of drippings from foodstuffs from the upper plate which may drop onto the upper surface of said sloping outer wall and pass downwardly into the channel through the space between the sloping outer wall and the inclined wall of the upper plate.

FRANK LA GRECA.

References Cited in the file of this patent

UNITED STATES PATENTS

| Number | Name | Date |
|---|---|---|
| 234,739 | Beattie | Nov. 23, 1880 |
| 258,221 | Conradt | May 23, 1882 |
| 284,531 | Berry | Sept. 4, 1883 |
| 885,475 | Hitchcock | Apr. 21, 1908 |
| 1,239,834 | Smith | Sept. 11, 1917 |
| 1,263,004 | Tollagsen | Apr. 16, 1918 |
| 1,948,778 | Zoia | Feb. 27, 1934 |
| 1,974,221 | Stonehouse | Sept. 18, 1934 |

FOREIGN PATENTS

| Number | Country | Date |
|---|---|---|
| 217,689 | Great Britain | June 26, 1924 |
| 242,877 | Great Britain | Nov. 19, 1925 |